May 25, 1926.
G. W. BULLEY
PROCESS OF MAKING RADIOCABINETS
Filed July 30, 1925
1,585,759
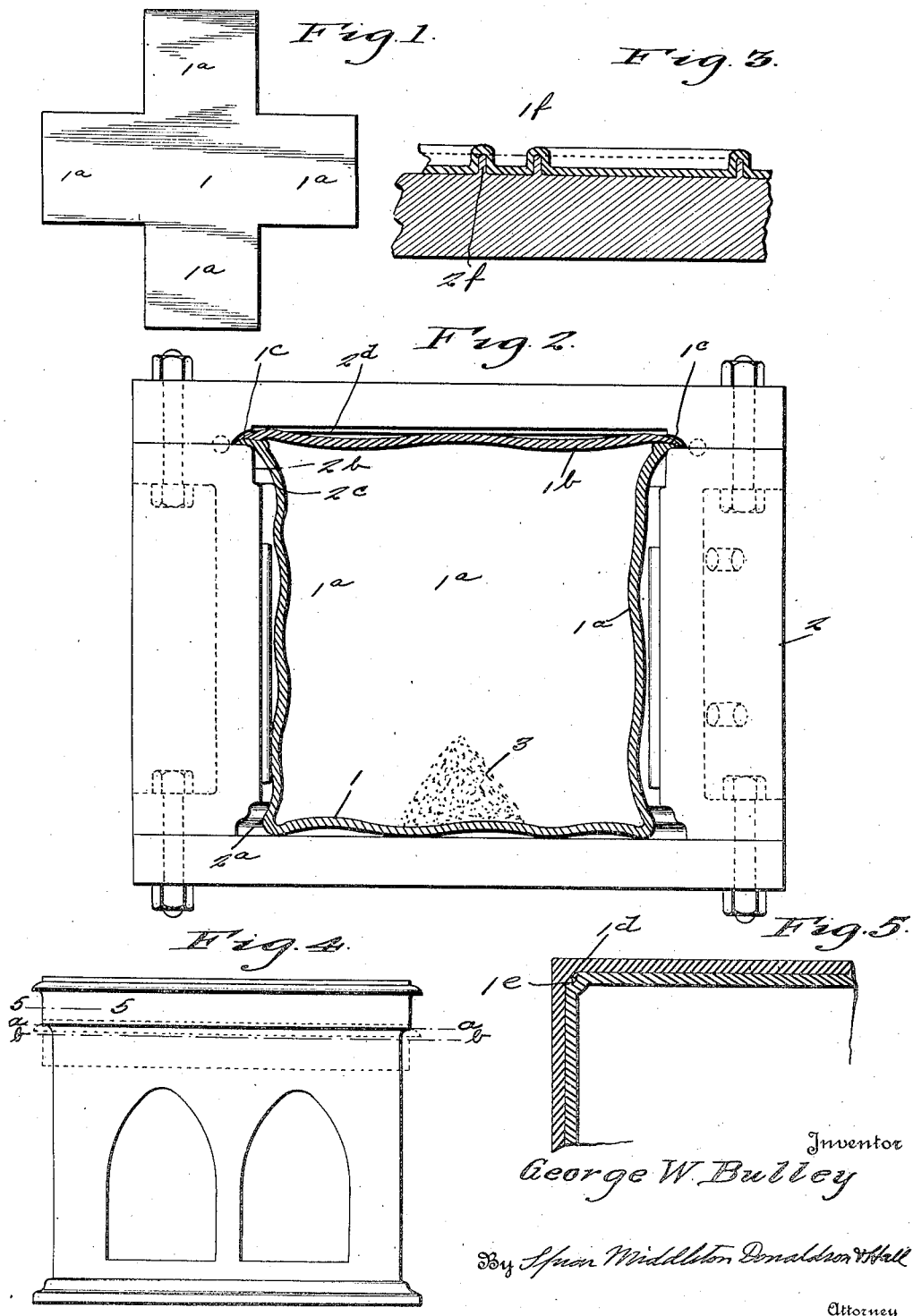

Patented May 25, 1926.

1,585,759

UNITED STATES PATENT OFFICE.

GEORGE W. BULLEY, OF AKRON, OHIO, ASSIGNOR TO THE MILLER RUBBER COMPANY, OF AKRON, OHIO, A CORPORATION OF OHIO.

PROCESS OF MAKING RADIOCABINETS.

Application filed July 30, 1925. Serial No. 47,118.

My present invention relates to improvements in hard rubber containers and aims more particularly to provide a radio cabinet composed entirely of hard vulcanized rubber, and the invention includes the novel process and article produced thereby as hereinafter described and defined by the appended claims.

In the accompanying drawings:

Figure 1 shows a blank from which the body of the article is made.

Fig. 2 is a transverse sectional view of a mold showing the blank with receptacle shape and the top blank applied.

Fig. 3 is a sectional detail showing the preferred maner of forming the grid openings.

Fig. 4 is a front elevation of the completed article, and

Fig. 5 is a sectional detail on line 5—5 of Fig. 4.

Referring by reference characters to this drawing the numeral 1 designates a blank or sheet of hard rubber compound such as I prefer to use comprising a rectangular portion 1 of the size and shape required for the bottom of the article and four (preferably integral) flaps $1^a$ for forming the four side walls, which blank may be conveniently cut from a single sheet of the proper size.

The four flaps are then turned up or folded to bring their edges into abutting positions, such edges being pressed together and caused to adhere by the tacky nature of the unvulcanized material. If desired the folding and pressing may be facilitated by the use of a suitable mandrel or form which would be removed after the shaping action. Such open topped receptacle like article is then placed in a mold 2 having the desired interior configurations, a suitable gas forming material or blower 3 deposited therein, and a top forming blank $1^b$ is applied, its edges being pressed into contact with the edges of the body portion, preferably so as to make an out turned seam as indicated at $1^c$. Thereafter the mold is closed and subjected to the vulcanizing temperature.

The mold is provided with an enlarged bottom portion or mold cavity $2^a$ to give to the completed article a broader base, and is also provided with an enlarged upper portion $2^b$ separated from the lower portion by a shoulder $2^c$, and the upper portion may also be provided with a groove or channel $2^d$ to form an ornamental bead or flange around the top.

After the mold is closed and heated the gasification of the blower produces internal fluid pressure which expands the rubber compound and causes it to take the exact shape of the mold cavity.

The side walls of the enlarged upper portion are offset sufficiently from the lower wall portions to cause the upper part of the container to be as much larger than the lower, (in cross sectional area) as the thickness of the walls, or slightly greater. Then by making saw cuts on the lines $a$ and $b$ and discarding the intervening material the top portion will form a slip or telescoping cover and will fit in position as shown in Fig. 4.

When articles of this nature are seamed together at the corners a ridge $1^d$ is likely to occur at the corners which would interfere with the telescoping of the cover. To avoid the effects of this I provide the mold at the upper corners at the proper place with ribs or enlargements which cause an inward bulge $1^e$ of the body portion at the corners where the ridges of the cover would come, thus producing rebates or approximately flattened or grooved corners to receive such ridges.

Where the cabinet is to be used for loud speaker purposes it is desired to form the front as a grid. A convenient manner of effecting this is to provide the front mold wall with ribs $2^f$ in its inner face of the proper shape, around which the rubber is forced by the blower in the shape of folds $1^f$. Then by grinding off these ridges the material is severed on the lines of the folds and the severed material removed, leaving grid openings.

What I claim is:

1. The hereindescribed method of making hard rubber containers having slip covers which consists in producing by vulcanization a unitary closed article having a top portion of larger sectional area and a remaining portion having rebated corners and severing said enlarged portion.

2. The hereindescribed method of making a hard rubber container having openings in the walls thereof which consists in producing by vulcanization a hard rubber container body having projecting or bulged portions defining said openings and removing said bulged portions.

3. The hereindescribed method of making a hard rubber container having openings in the walls thereof which consists in producing by vulcanization a hard rubber container body having projecting ribs defining said openings, and thereafter grinding off said ribs.

4. The hereindescribed method of making a container of hard rubber having a slip cover, which consists in forming a hollow body of hard rubber compound, enclosing the same in a mold having an enlarged upper part and designed so as to be provided with convex fillets in the corners below said enlarged upper part, subjecting the same to curing heat with internal fluid pressure, and finally severing the top on the line of outward bulge produced by said enlarged top.

In testimony whereof I affix my signature.

GEORGE W. BULLEY.